United States Patent [19]
Benmohamed et al.

[11] Patent Number: 6,147,969
[45] Date of Patent: Nov. 14, 2000

[54] FLOW CONTROL METHOD FOR ABR SERVICE IN AN ASYNCHRONOUS TRANSFER MODE NETWORK

[75] Inventors: Lofti Benmohamed, Freehold; Yung-Terng Wang, Marlboro; Wing Cheong Lau, Eatontown, all of N.J.

[73] Assignee: Lucent Technologies Inc., Murray Hill, N.J.

[21] Appl. No.: 09/173,955

[22] Filed: Oct. 14, 1998

[51] Int. Cl.[7] .................................................. H04L 12/26
[52] U.S. Cl. ........................ 370/230; 370/413; 370/429
[58] Field of Search ................................... 370/229, 230, 370/231, 232, 233, 234, 235, 236, 237, 238, 239, 240, 412, 413, 414, 415, 416, 417, 418, 422, 423, 427, 428, 429

[56] References Cited

U.S. PATENT DOCUMENTS

| | | | |
|---|---|---|---|
| 5,777,984 | 7/1998 | Gun et al. ................................ | 370/230 |
| 5,790,545 | 8/1998 | Holt et al. ................................ | 370/398 |

OTHER PUBLICATIONS

Jiang et al., "Improved Consolidation Algorithms for Point--to-Multipoint ABR Service," Proceedings of IEEE ATM Workshop, pp. 195–205, (May 1998).
Chiussi et al., "Dynamic Max Rate Control Algorithm for Available Bit Rate Service in ATM Networks," IEEE Globecom '96, pp. 2108–2117.
Roberts, Lawrence G., "Point–to–Multipoint ABR Operation," ATM Forum/95–0834 (Aug. 7, 1995).
Roberts, Lawrence G., "Addition to TM Spec 4.0 on Point--to-Multipoint," ATM Forum/95–0339 (Apr. 10, 1995).
Bonomi et al., "ABR Point–to–Multipoint Connections," ATM Forum/95–0974(R1), pp.1–4.
Awdeh et al., "Point–to–Multipoint Behavior of ABR," ATM Forum/95–0941 (Aug. 7–11, 1995), pp. 1–3.
Roberts, Larry, "Rate Based Algorithm for Point–to–Multipoint ABR Service," ATM Forum/94–0772(R1) (Nov. 10, 1994).
Hunt, Doug, "Open Issues for ABR Point–to–Multipoint Connections," ATM Forum/95–1034 (Aug. 7–11, 1995).
The ATM Forum Technical Committee, "Traffic Management Specification," ATM Forum (Apr. 1996).
Fahmy et al., "Feedback Consolidation Algortihms for ABR Point–to–Multipoint Connections," ATM Forum/97–0615 (Jul. 1997)

*Primary Examiner*—Chi H. Pham
*Assistant Examiner*—Kwang B. Yao
*Attorney, Agent, or Firm*—Darby & Darby

[57] ABSTRACT

An improved flow control method for ABR service in an ATM network. In particular, a dual local/global ingress flow control method for ABR service in a distributed ingress queueing switch including a plurality of ingress buffer-pools, at least one shared buffer-pool and a plurality of egress buffer-pools. Utilization of the egress port of each shared buffer-pool is periodically measured and together with the current state of the global-ingress control forms the basis for toggling global-ingress control in an active/inactive state. Queue-length based flow control algorithms such as DMRCA are applied to each resource management cell for the egress subport queue and ingress flow queue through which the resource management cell passes to determine the egress and local-ingress congestion marking values, respectively, for the resource management cell. In addition, global-ingress congestion is detected by applying a queue-length based flow control algorithm to the summation of the ingress flow queues contributing to the shared buffer-pool egress port through which the resource management cell passed. If global-ingress control is active then the resource management cell is marked based on the merged egress, global-ingress, local-ingress congestion marking values and the congestion marking values originally carried by the resource management cell. Otherwise the resource management cell is marked based on the merged egress, local-ingress congestion marking values and the congestion marking values originally carried by the resource management cell.

12 Claims, 5 Drawing Sheets

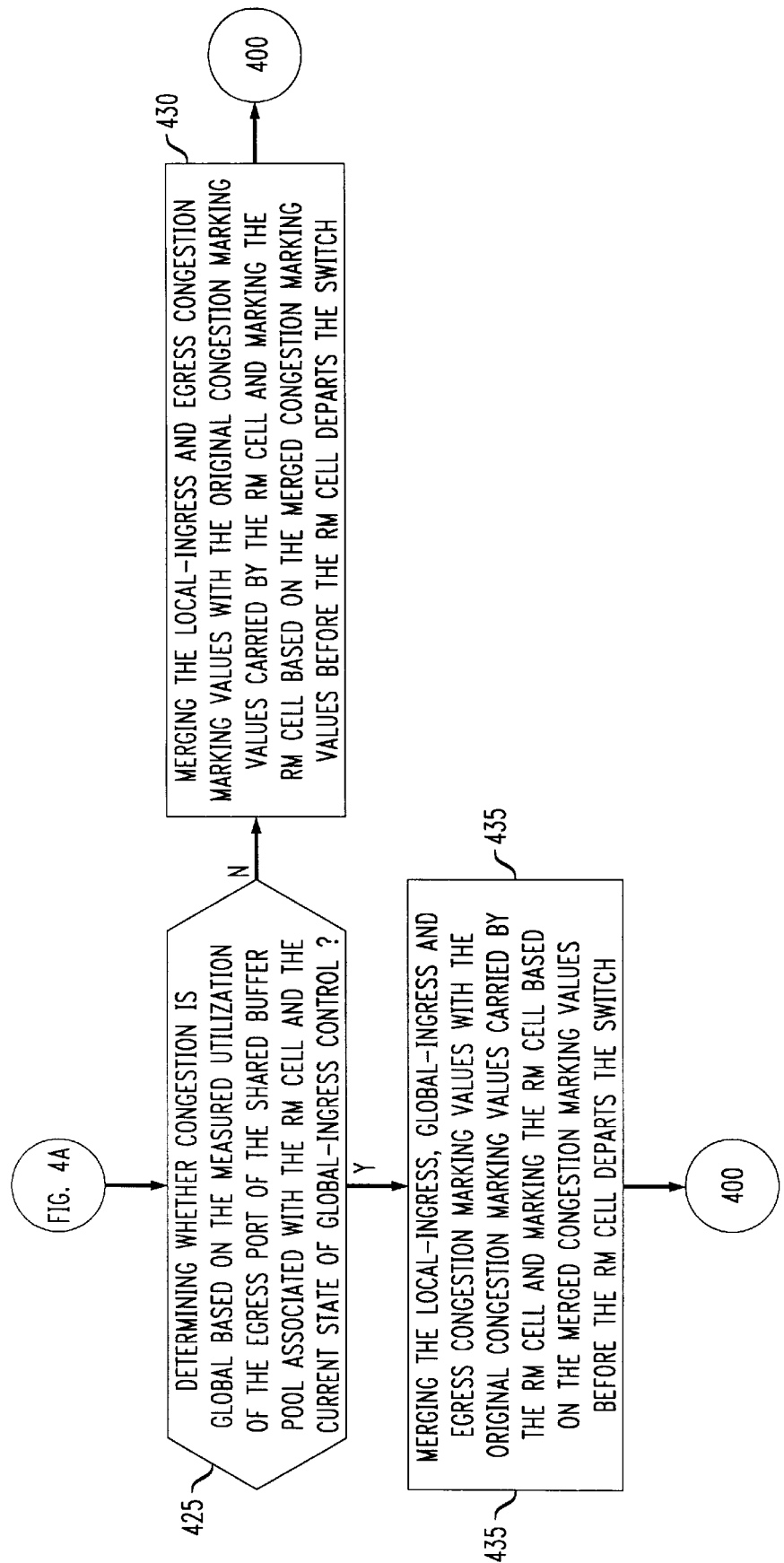

FLOW CONTROL METHOD FOR ABR SERVICE IN AN ASYNCHRONOUS TRANSFER MODE NETWORK

FIELD OF THE INVENTION

The present invention relates to a method for controlling the flow of data for Available Bit Rate service in an Asynchronous Transfer Mode network. Specifically, the invention is directed to a utilization-based dual flow control method for Available Bit Rate service in a distributed ingress queueing switch.

Asynchronous Transfer Mode (ATM) networks provide an Available Bit Rate (ABR) service in which the data rate or flow is adjusted based on network congestion information. In the network each switch employs an algorithm to detect and indicate congestion. According to the classification described by Enrique J. Hernandez-Valencia et al., "Rate Control Algorithms for the ATM ABR Service", European Transactions on Telecommunications, Vol. 8, No. 1, pp. 7–20, January–February 1997, which is herein incorporated by reference, there are two major types of explicit-rate ABR flow control algorithms. The first type is referred to as "queue-length based explicit rate algorithms" such as those proposed by L. Benmohamed and S. Meerkov, "Feedback Control of Congestion in Packet Switching Networks: The Case of a Single Congested Node", IEEE/ACM Transactions on Networking, Vol. 1, No. 6, pp. 693–708 (1993); A. Elwalid, "Analysis of Adaptive Rate-Based Congestion Control for Highspeed Wide Area ATM Networks", Proc. IEEE ICC, pp. 948–953 (1995); S. Chong, R. Nagarajan and Y. T. Wang, "Explicit Rate-Based Flow Control for ATM ABR Services in a Dynamic Environment", IEEE LAN/MAN Workshop, Berlin (August 1996); F. M. Chiussi et al., "Dynamic Max Rate Control Algorithm for Available Bit Rate Service in ATM Networks", IEEE Globecom '96 (November 1996), all of which are herein incorporated by reference. The other type of algorithms are referred to as "pure-rate based algorithms" such as those proposed by L. Roberts, "Enhanced Proportional Rate Control Algorithm", ATM Forum Contribution 94-0735(R1) (1994); R. Jain, "ERICA Switch Algorithm: A Complete Description", ATM Forum Contribution 96-1172 (August 1996); L. Kalampoukas et al., "An Efficient Rate Allocation Algorithm for ATM Networks Providing Max-Min Fairness", Proc. of IEEE-IFIP Conference on Broadband Communications (1996); A. Charny, "An Algorithm for Rate Allocation in a Packet-Switching Network with Feedbacks", MIT thesis (1994), all of which are herein incorporated by reference.

In the queue-length based explicit rate algorithms, queue-length at a congestion point is monitored and the resultant queue-length information is used to determine the rate of allocation for each ABR virtual circuit (VC). While it is straightforward to apply queue-length based explicit rate algorithms for ATM devices, such as ATM switches or ATM multiplexers, that contain single/multiple independent congestion points (bottlenecks), e.g. output-buffer-only ATM switches, their application to ATM devices which contain multiple dependent congestion points requires new control strategies such as that proposed by the present invention.

The ATM switch shown in FIG. 1 and described in detail below is an example of an ATM device in which multiple dependent congestion points/bottlenecks may exist within the switch due to its distributed ingress-queueing architecture. Depending on the type of I/O interface cards installed in the switch, congestion may develop at the egress I/O cards 30A–30O, in the switch fabric 20, as well as at the ingress I/O cards 10A–10O. Moreover, the existence or development of these multiple congestions points depend on one another. If a queue-length based explicit rate algorithm, as for example the Dynamic Max Rate Control Algorithm (DMRCA), is employed only at the egress ATM Buffer Manager (ABM) within an I/O card, not all types of congestion will be detected. Although the DMRCA or some other queue-length based ABR flow control algorithm, which monitors congestion at only the egress ABM, is sufficient to handle ABR traffic congestion of DS3/E3 cards they are not adequate for handling multiple congestion points (bottlenecks) in a distributed ingress queueing switch architecture, as for example with one or more 4-port OC3 I/O cards or single-port OC12 I/O cards, under some circumstances.

It is therefore desirable to develop a flow control method for detecting multiple dependent congestion points in an ABR distributed ingress queueing switch architecture.

SUMMARY OF THE INVENTION

The present invention relates to an improved flow control method for use in ABR service in an ATM network. In particular, the invention is directed to a dual flow control method for available bit rate service in a distributed ingress queueing switch architecture using resource management cells carrying original congestion marking values. The distributed ingress queueing switch includes a plurality of egress buffer- pools each having at least one egress subport, at least one shared buffer-pool feeding into the egress buffer-pools, and a plurality of ingress buffer-pools feeding into the shared buffer-pool. Each ingress buffer-pool has a flow queue corresponding to each egress buffer-pool and each shared buffer-pool has at least one egress port. The utilization of the egress port of each shared buffer-pool is periodically measured. A first queue-length based flow control algorithm is then performed for each resource management cell for its associated ingress flow queue to generate localingress congestion marking values for the resource management cell. A summation of all ingress flow queues contributing to each egress port of each shared buffer-pool is calculated. Thereafter, a second queue-length based flow control algorithm is performed for the resource management cell using the summation of all ingress flow queues contributing to the shared buffer-pool egress port associated with the resource management cell to generate global-ingress congestion marking values for the resource management cell. A determination is made whether congestion of the shared buffer-pool egress port associated with the resource management cell is global based on the measured utilization of the shared buffer-pool egress port and a current state of global-ingress control. If the congestion is not global then the local-ingress congestion marking values and original congestion marking values carried by the resource management cell are merged, the resource management cell is marked based on the merged congestion marking values and the process is repeated beginning with the step of periodically measuring the utilization of the egress port of each shared buffer-pool. Otherwise, if the congestion is global then the local-ingress congestion marking values, the global-ingress congestion marking values and the original congestion marking values carried by the resource management cell are merged, the resource management cell is marked based on the merged congestion marking values, and the process is repeated beginning with the step of periodically measuring the utilization of the egress port of each shared buffer-pool.

In addition, the invention is directed to a dual flow rate control method for available bit rate service in a distributed ingress queueing switch architecture using resource management cells carrying original congestion marking values. The switch includes a plurality of egress buffer-pools each having at least one egress subport, at least one shared buffer-pool feeding into the egress buffer-pools, and a plurality of ingress buffer-pools feeding into the shared buffer-pool. Each ingress buffer-pool has a flow queue corresponding to each egress buffer-pool and each shared buffer-pool has at least one egress port. The utilization of the egress port of each shared buffer-pool is periodically measured. A first queue-length based flow control algorithm is performed for each resource management cell for its associated egress subport queue to generate egress congestion marking values for the resource management cell. A second queue-length based flow control algorithm is performed for the resource management cell for its associated ingress flow queue to generate local-ingress congestion marking values for the resource management cell. Then the summation of all ingress flow queues contributing to each egress port of each shared buffer-pool is calculated. A third queue-length based flow control algorithm is performed for the resource management cell using the summation of all ingress flow queues contributing to the shared buffer-pool egress port associated with the resource management cell to generate global-ingress congestion marking values for the resource management cell. Then it is determined whether congestion of the shared buffer-pool egress port associated with the resource management cell is global based on the measured utilization of the shared buffer-pool egress port and a current state of global-ingress control. If the congestion is not global then the egress congestion marking values, the local-ingress congestion marking values and the original congestion marking values carried by the resource management cell are merged, the resource management cell is marked based on the merged congestion marking values and the process is repeated beginning with the step of periodically measuring the utilization of the egress port of each shared buffer-pool. Otherwise, if the congestion is global the egress congestion marking values, the local-ingress congestion marking values, the global-ingress congestion marking values and the original congestion marking values carried by the resource management cell are merged, the resource management cell is marked based on the merged congestion marking values and the process is repeated beginning with the step of periodically measuring the utilization of the egress port of each shared buffer pool.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWING

In the drawing, wherein like reference numerals denote similar elements throughout the several views:

FIGS. 4a and 4b show a flow chart of the dual ABR flow control method in accordance with the present invention.

DETAILED DESCRIPTION OF THE INVENTION

Figure 1:
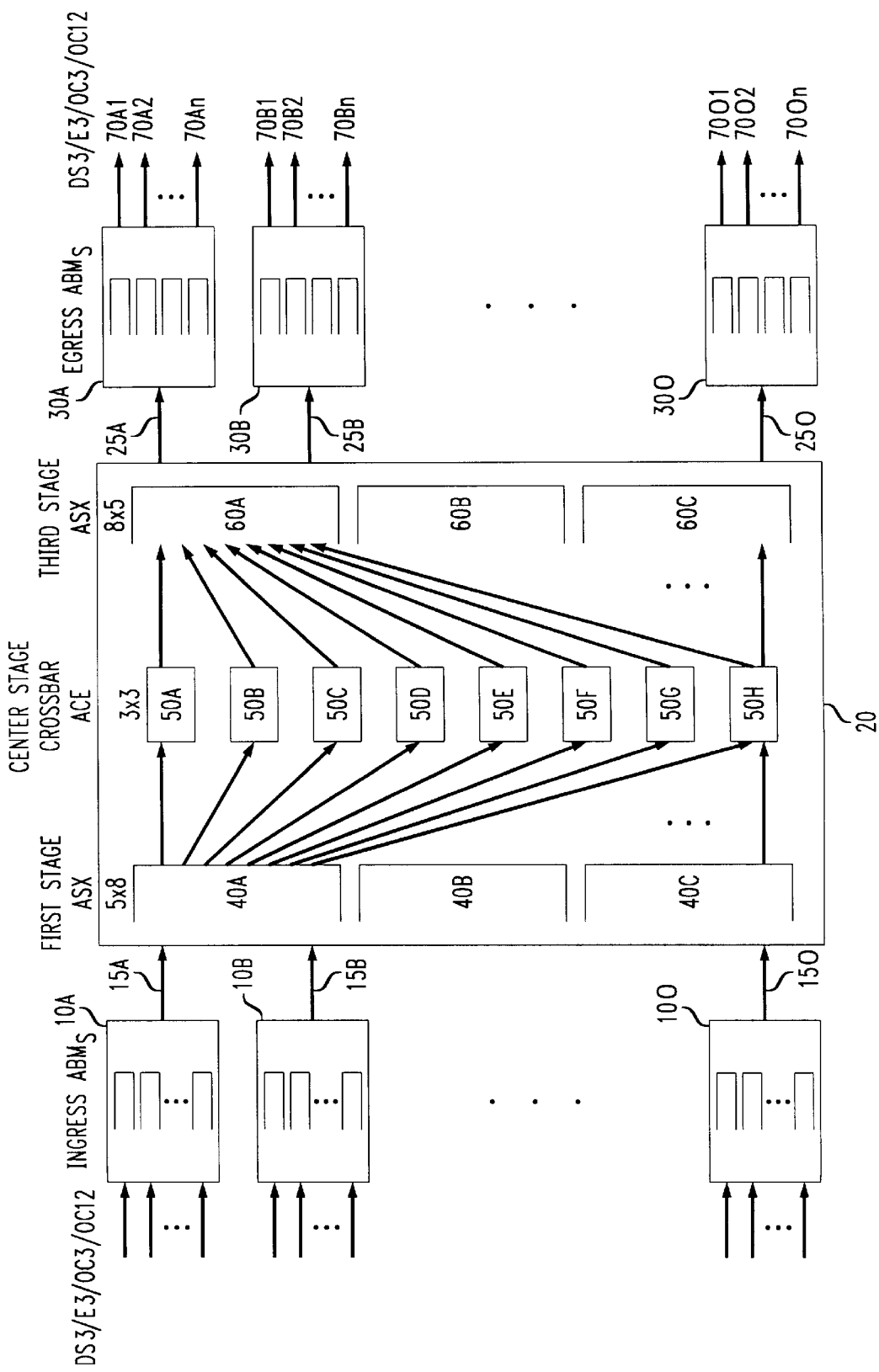
FIG. 1 is an example of a distributed ingress queueing switch.
Figure 2:
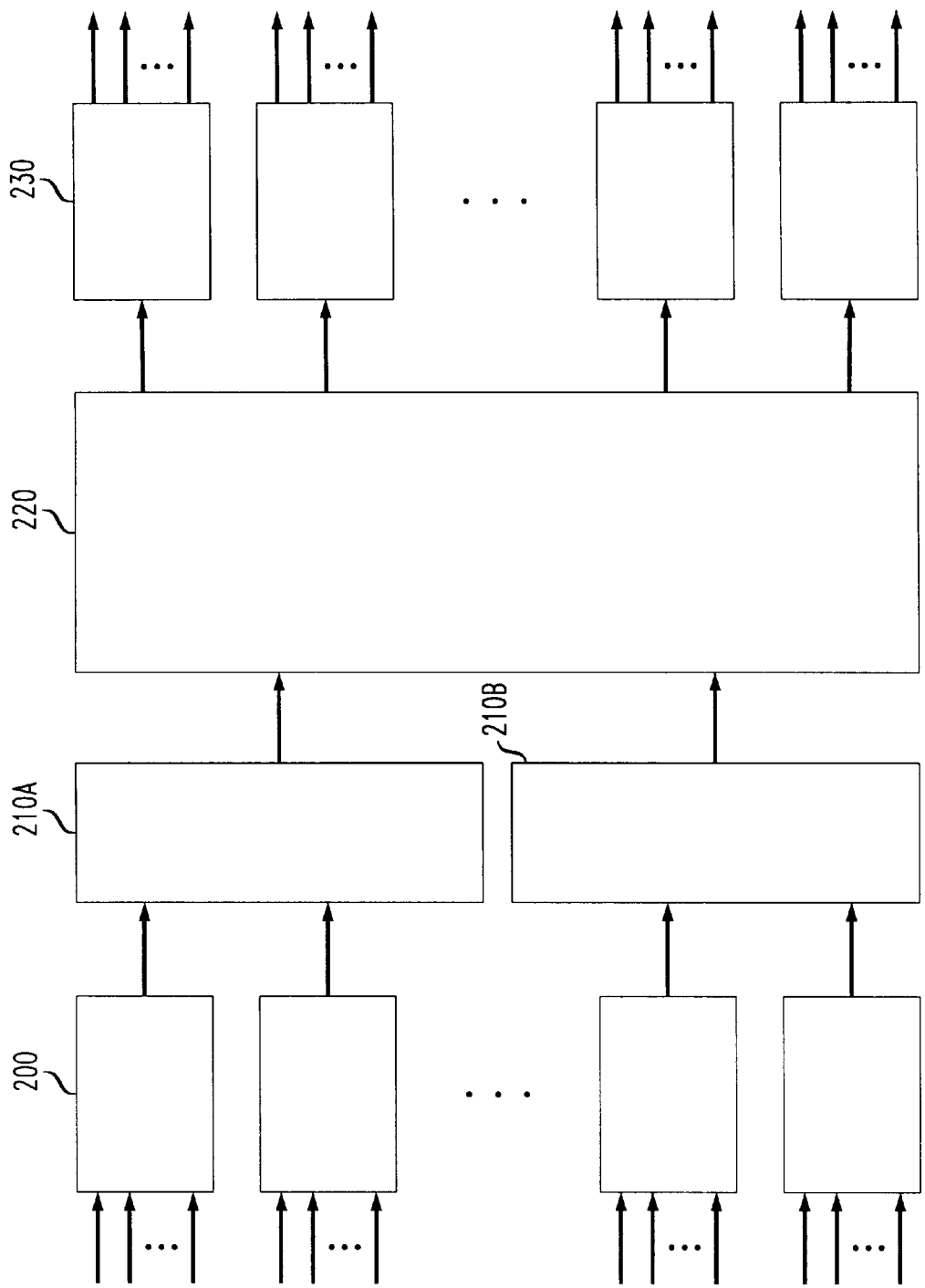
FIG. 2 is another example of a distributed ingress queueing switch with two hierarchical levels of shared buffer-pools.

The present invention is directed to a flow control algorithm suitable for monitoring multiple congestion points in an ABR distributed ingress queueing switch architecture comprising a first level of a plurality of ingress buffer-pools (e.g. ingress ABMs) feeding into one or more levels of shared buffer-pools (e.g. a switch fabric), in which overflow from each shared buffer-pool is back-pressured into the ingress buffer-pools and/or shared buffer-pools of the preceding level. The occupancy of each shared buffer-pool in each level is not observable. However, the congestion status of each shared buffer-pool may be inferred based on the queue-lengths of the corresponding ingress buffer-pools. FIG. 1 shows, by way of example, an ATM switch architecture including 15 ingress ABMs, 15 egress ABMs and a 15×15 switch fabric disposed therebetween. Switch fabric 20 includes a first stage of three 5×8 ATM Switch Elements (ASXs) 40A, 40B, 40C, a second stage of eight 3×3 ATM Crossbar Elements (ACE) 50A–50H, and a third stage of three 8×5 ASXs 60A, 60B, 60C. Each ASX in the first stage has 5 fabric ingress ports for a total of 15 fabric ingress ports 15A, 15B, . . . 15O, and each ASX in the third stage has 5 fabric egress ports for a total of 15 fabric egress ports 25A, 25B, . . . 25O. Each ingress ABM 10A–10O is connected to one of the fabric ingress ports 25A, 15B, . . . 15O while each egress ABM 30A–30O is connected to one of the fabric egress ports 25A, 25B, . . . 25O. Inside each ingress ABM cells destined to different egress ports of the switching fabric 20 are placed in separate logical ingress flow queues. Each egress ABM has at least one egress subport 70A1, 70A2, . . . 70An, 70B1, 70B2, . . . 70Bn, . . . 70O1, 70O2, . . . 70On. Inside each egress ABM, cells destined to different egress subports of the egress ABM are placed in separate logical egress subport queues. Although the distributed ingress queueing switch shown in FIG. 1 includes only a single shared buffer- pool level (switch fabric 20), a distributed ingress queueing switch may have more than one hierarchical shared buffer-pool level, as shown in FIG. 2, including a plurality of ingress and egress buffer-pools 200, 230, and a higher level of shared buffer-pools 210A, 210B that feed into a lower level shared buffer-pool 220.

In the distributed ingress queueing switch shown in FIG. 1 three types of congestion may arise based on the location of the congestion in the switch architecture. A first type of congestion is a focused overload congestion within the switch fabric 20 which occurs when the aggregate ABR traffic volume from the multiple ingress ABMs 10A–10O is greater than the bandwidth of the destination fabric egress port, that is, an egress port of one of the third stage ASXs 60A, 60B, 60C. The ASXs of the first and third stages generally have a relatively small buffer size of 512 cells each. Thus, in this case, the queue at the third stage ASX backs-up and the data is back-pressured to the ingress ABMs. Persistent ABR sources from multiple ingress ABMs will generally attempt to saturate the switch fabric 20 and, thus, result in back-pressure against corresponding flow queues in the ingress ABMs.

A second type of congestion is caused by bandwidth contention at the second stage ACEs of the switch fabric among traffic transmitted from different first stage ASXs to the same third stage ASX. In this case, one or more queues in the first stage ASXs become backed-up and the data is back-pressured into a subset of ingress ABMs.

Still a third type of congestion is due to bandwidth congestion in the "logical" link between an ingress ABM and the ingress port of the switch fabric. This type of congestion is caused by the interaction of (1) backlogged cells inside the ingress ABM, (2) the round-robin scheduling mechanism among different flow queues within an ingress ABM, and (3) the scheduling for traffic of different delay priorities within the same flow queue. In general, the third type of congestion will occur if the aggregate input rate to an ingress ABM exceeds the output bandwidth available between the ingress ABM and the ingress port of the switch fabric.

In the case of a single-port OC12 I/O card, for example, the speed of the fabric egress port is identical to the speed of the egress subport in the I/O card so that no queue will develop at the egress ABM beyond what is needed for the pipelined operation of the ATM Layer Manager (ALM) also residing in the I/O card. Likewise, in the case of the 4-port OC3 I/O card when all four of the OC3 subports are equally loaded the sum of the egress subport capacities is equal to the speed of the fabric egress port. Under these circumstances, congestion will occur only at the first and third stage ASX, not at the egress ABMs. As a result of congestion at the first and third stage ASX the data will back-up and cause congestion at the ingress ABMs. Any queue-length based ABR algorithm which only monitors the queue within the egress ABMs will not detect nor manage ABR traffic congestion that develops in the switch fabric and/or at the ingress ABMs of the switch when a single-port OC12 I/O or 4-port OC3 I/O card is employed.

Increased ingress ABM queue lengths may therefore be caused by one or more of these three different types of congestion. It is desirable to distinguish among these different types of congestion since the respective bottlenecks and set of ABR VCs contending for the bottleneck differ. An ABR flow control strategy will preferably control possible focused-overload at the fabric egress port so that the aggregate traffic from various ingress ABMs does not exceed the fabric egress port speed. In addition, the queue length at the ingress ABMs is preferably controlled to minimize cell loss as a result of one of the three different types of congestion while maximizing bandwidth utilization and max-min fairness among ABR VCs.

The inventive dual ABR flow control algorithm performs separate local-ingress and global-ingress control to detect congestion for the ingress buffer-pools and shared buffer-pools, respectively. In particular, the inventive dual ABR method controls local as well as global-ingress congestion based on the ingress queue-length information collected at the ingress buffer-pools and stored in internal ABR cell headers. The control algorithms are preferably physically implemented in explicit rate managers (ERMs) connected to each interface (I/O) card. If the distributed ingress queueing switch includes more than one level of shared buffer-pools, as for example shown in FIG. 2, then the global-ingress control technique is applied to each shared buffer-pool at each level.

As described in detail above, localized congestion occurs at the ingress buffer-pools (second or third type of congestion). Local-ingress flow control is realized by monitoring each ingress flow queue $q_i$ in every ingress buffer-pool and employing a conventional queue-length based flow control algorithm such as the DMRCA algorithm described below to compute the corresponding congestion marking values, namely, the explicit rate (ER) field value, the congestion indication (CI) bit value and the no-increase (NI) bit value for RM cells passing through the ingress flow queue. The computed local-ingress congestion marking values of an RM cell for its associated ingress flow queue are denoted as $(ER_i, CI_i, NI_i)$ while the original congestion marking values carried by the RM cell are denoted as $(ER_{orig}, CI_{orig}, NI_{orig})$.

By way of example, if the DMRCA described by F. M. Chiussi et al., "Dynamic Max Rate Control Algorithm for Available Bit Rate Service in ATM Networks", IEEE Globecom '96 (November 1996), is used as the flow control algorithm then the queue-length $q_i$ of the ingress flow queue associated with an incoming RM cell is compared to a local queue-length control upper threshold $DQT_i$ and a local queue-length control lower threshold $QT_i$. If the ingress flow queue-length is greater than or equal to $DQT_i$, then the $CI_i$ bit is set to "1" and the $ER_i$ value is assigned a "set" value calculated as $$ER_i = Amax_i \cdot MRF$$

where $Amax_i$ is an adjusted maximum rate calculated as $Amax_i = (1-alpha) \cdot Amax_i + alpha \cdot Max_i$, where alpha is an averaging factor, $0 \leq alpha \leq 1$, e.g. $1/16$, and $MAX_i$ is the maximum cell rate among all ABR VCs passing through the ingress flow queue;

MRF is a major reduction factor, e.g. $7/8$.

Otherwise, if the ingress flow queue-length is greater than or equal to $QT_i$ but less than $DQT_i$ then a marking threshold is calculated as $$\text{Marking threshold} = Amax \cdot Fn_i(q_i)$$

where $Amax_i$ and $MAX_i$ are defined above, and $Fn_i( )$ is a discrete non-increasing correcting function, $0 \leq Fn_i( ) \leq 1$.

If the calculated marking threshold is less than or equal to the current cell rate (CCR) carried by the RM cell, then the $CI_i$ bit is set to "1" and $ER_i$, is assigned a "not set" value since the $ER_i$ is not calculated. When the flow control algorithm is applied and a value for the ER field is not calculated it still must be assigned a "not set" value in order to perform the merging operation of a plurality of groups of congestion marking values described in detail below. Otherwise, when the ingress flow queue-length $q_i$ is less than $QT_i$ then the switch is not congested and both the $CI_i$ and $NI_i$ bits are set to "0" and $ER_i$ is assigned a "not set" value. The local queue-length thresholds $DQT_i$ and $QT_i$ are set on a per ingress flow queue basis.

Global-ingress congestion is caused by focused-overload at the shared buffer-pool (the first type of congestion). For each egress port 25A, 25B, . . . 25O of the shared buffer-pool 20 the summation $\Sigma q_j$ of the queue-lengths over all contributing ingress flow queues is calculated. Global-ingress control is realized by employing a conventional queue-length based flow control algorithm such as the DMRCA flow control algorithm described above for each egress port of the shared buffer-pool to compute the corresponding global-ingress congestion marking values $(ER_g, CI_g, NI_g)$ for an RM cell passing through the associated shared buffer-pool egress port, wherein the queue-length is the summation $\Sigma q_j$ of the queue-lengths over all contributing ingress flow queues to the egress port of the shared buffer-pool. For example, if the DMRCA is used as the flow control algorithm, the $\Sigma q_j$ is compared with a global queue-length control upper threshold $DQT_g$ and a global queue-length control lower threshold $QT_g$. If $\Sigma q_j$ is greater than or equal to $DQT_g$, then the $CI_g$ bit is set to "1" and the $ER_g$ field is assigned a "set" value equal to $Amax_g \cdot MRF$, wherein $Amax_g$ is an adjusted maximum rate calculated as $Amax_g=(1-alpha) \cdot Amax_g+alpha\, MAX_g$, where alpha is an averaging factor, $0 \leq alpha \leq 1$, e.g. $\frac{1}{16}$, and $MAX_g$ is the maximum cell rate among all ABR VCs passing through the egress port of the shared buffer-pool. Otherwise, if $\Sigma\, q_j$ is greater than or equal to $QT_g$ but less than $DQT_g$ then the marking threshold is calculated as $Amax_g \cdot Fn_g(q_j)$ where $Fn_g(\ )$ is a discrete non-increasing correcting function, $0 \leq Fn_g(\ ) \leq 1$. If the marking threshold is less than or equal to the CCR carried by the RM cell, then the $CI_g$ bit is set to "1" and $ER_g$ is assigned a "not set" value. However, if the $\Sigma\, q_j$ is less than $QT_g$ then the switch is not congested and both the $CI_g$ and $NI_g$ bits are set to "0" and $ER_g$ is assigned a "not set" value.

Egress buffer-pool congestion can also occur at the egress ABMs 30A, 30B, . . . 30O due to overload of one or more egress subports at the egress buffer 30A. For each egress subport (70A1, 70A2, . . . 70An, 70B1, 70B2, . . . 70Bn, . . . 70O1, 70O2, . . . 70On) of each egress buffer-pool (egress ABM 30A, 30B, . . . 30O) egress congestion control is realized by employing a conventional queue-length based flow control algorithm such as the DMRCA flow control algorithm described above for each egress subport of each egress ABM to compute the corresponding egress congestion marking values ($ER_e$, $CI_e$, $NI_e$) for RM cells passing through its associated egress subport, wherein the queue-length is the egress subport queue-length $q_e$. For example, if the DMRCA flow control algorithm is used, $q_e$ is compared with an egress queue-length control upper threshold $DQT_e$ and an egress queue-length control lower threshold $QT_e$. If $q_e$ is greater than or equal to $DQT_e$ then the $CI_e$, bit is set to "1" and the $ER_e$ field is assigned a "set" value equal to $Amax_e \cdot MRF$, wherein $Amax_e$ is an adjusted maximum rate calculated as $Amax_e=(1-alpha) \cdot Amax_e+alpha \cdot MAX_e$, where alpha is an averaging factor, $0 \leq alpha \leq 1$, e.g. $\frac{1}{16}$, and $MAX_e$ is the maximum cell rate among all ABR VCs passing through the egress subport. Otherwise, if $q_e$, is greater than or equal to $QT_e$ but less than $DQT_e$ then the marking threshold is calculated as $Amax_e \cdot Fn_e(q_e)$ where $Fn_e(\ )$ is a discrete non-increasing correcting function, $0 \leq Fn_e(\ ) \leq 1$. If the marking threshold is less than or equal to the CCR carried by the RM cell, then the $CI_e$ bit is set to "1" and $ER_e$, is assigned a "not set" value. However, if the $q_e$, is less than $QT_e$ then the switch is not congested and both the $CI_e$ and $NI_e$ bits are set to "0" and $ER_e$ is assigned a "not set" value.

Now the criteria for applying local-ingress vs. global-ingress control will be described. Testing has revealed that continuous use of both local-ingress and global-ingress control techniques may undesirably interfere with one another and, under some circumstances, result in underutilization of the bandwidth of the egress ports of the shared buffer-pool. Thus, in order to optimize system performance and utilization of the shared buffer-pool egress bandwidth, the local-ingress and/or global-ingress control operations are preferably selectively activated/deactivated based on different traffic conditions. In a preferred embodiment, to improve the transient queue-length performance local-ingress control should always be performed (remain active) regardless of the measured utilization and the state of the global-ingress control. Local-ingress control alone is sufficient to attain max-min fairness in bandwidth sharing among all ABR VCs when no focused-overload exists on the egress switch port. This situation occurs when the egress port of the shared buffer-pool is underutilized below some predetermined utilization threshold. However, when the utilization of the egress port of the shared buffer-pool exceeds some predetermined threshold then global-ingress control is also required. Activation of the global-ingress control in this case provides fairness among ABR VCs from different ingress buffer-pools.

Toggling of the global-ingress control between an active/inactive state is based on the utilization of the egress port of the shared buffer-pool and the current state of global-ingress control (active/inactive). The utilization of the egress port of the shared buffer-pool is periodically measured every predetermined number of time units, for example, every 1000 cell time slots. Methods for measuring the utilization of each egress port are well known and thus will not be described in detail. In a preferred embodiment, depending on the current state of ingress control the measured utilization is compared to one of two different predetermined thresholds. If the current state of global-ingress control is "inactive" then global-ingress control remains inactive until the measured utilization is greater than or equal to some predetermined local-to-global (LTG) threshold, whereas if the current state of global-ingress control is "active" then global-ingress control is not deactivated until the measured utilization is less than or equal to some predetermined global-to-local (GTL) threshold. In a preferred embodiment the LTG and GTL thresholds are not equal, however, the two thresholds may be set equal to one another while sacrificing transient queue-length and/or max-min fairness performance due to unnecessary ON/OFF switching of the global-ingress control mechanism. Supplementary delay counters are also preferably employed to provide hysteresis effects, avoid rapid switching back-and-forth between global "active"/"inactive" ingress control states and prevent undesirable changes in the ingress control state caused by transient fluctuations in utilization. The supplementary delay counters prevent toggling of the global-ingress control until the measured utilization of the egress port of the shared buffer-pool remains above/below the LTG/GTL thresholds respectively for some predetermined delay countdown.

Figure 3:
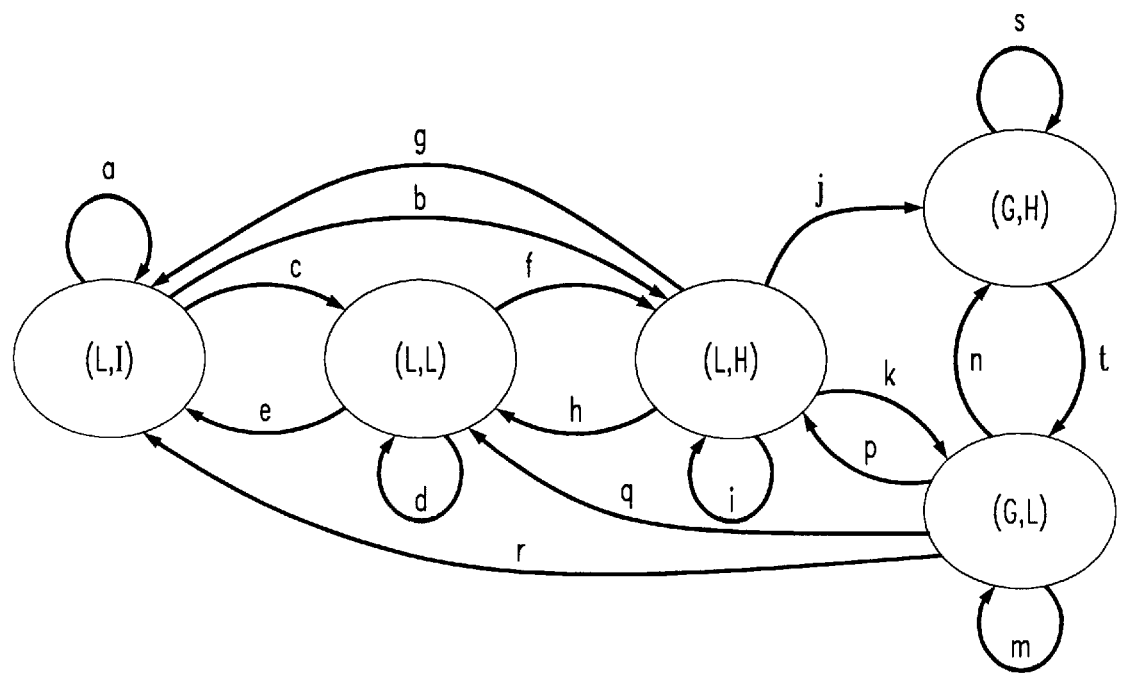
FIG. 3 is an example of a state transition diagram for toggling global-ingress control based on various utilization thresholds and activation delay counters.

FIG. 3 shows, by way of example, a state transition diagram for toggling global-ingress control implementing various utilization thresholds and activation delay counters. In the state diagram the circles denote the respective states and the lines represent the possible transitions between the states. Each state is defined by two parameters (X,Y), where X represents the ingress control state as either "L"(only local-ingress control is active) or "G"(local-ingress and global-ingress control are active) and Y identifies the measured utilization of the egress port of the shared buffer-pool being controlled as "I"(when the switch is idle), "L"(low utilization) or "H"(high utilization). Initially, the switch is in a (L,I) state with the local-ingress control active and the utilization idle. If the next measured utilization is below the idle threshold (line "a") then the utilization state remains (L,I). Should the next measured utilization exceed some predetermined local-to-global (LTG) threshold (line "b") then the utilization state is updated to (L,H), otherwise if the next measured utilization lies between the high and idle utilization thresholds (line "c") then the new utilization state is (L,L).

While in the (L,L) state if the next measured utilization is between the idle and the LTG threshold then the utilization state remains the same (line "d"). If the next measured utilization falls below the idle threshold (line "e") then the new utilization state is (L,I) and a $Been_{13}IDLE$ bit is set, otherwise if the next measured utilization exceeds the LTG threshold (line "f") then the new utilization state is (L,H).

While in the (L,H) state the measured utilization must exceed the LTG threshold for some predetermined delay period before the global-ingress control is activated as indicated by the countdown of a local-to-global activation delay counter. Thus, as shown in the state diagram, while in the (L,H) state even if the measured utilization exceeds the LTG threshold it will loop back to the (L,H) state (line "i") until countdown of the local-to-global activation delay counter at which time it will transition to the (G,H) state. Implementation of this delay period will prevent undesirable transient switching between ingress control states. If the local-to-global activation counter countdown expires or the Been-IDLE bit is set the new ingress control state will be either (G,H) via line "j" or (G,L) via line "k" depending on whether the next measured utilization after activation of the global-ingress control is greater-than-or-equal to or less than a predetermined global-to-local (GTL) threshold, respectively. While in the (L,H) state if the next measured utilization falls below the idle threshold (line "g") then a Been$_{13}$IDLE bit is set and a local-to-global activation delay counter is reset; otherwise, if the next measured utilization falls below the LTG threshold but exceeds the idle threshold (line "h") then the local-to-global activation delay counter is reset.

While in the (G,H) state if the next measured utilization remains above the GTL threshold (line "s") then it remains in this state, otherwise if the next measured utilization falls below the GTL threshold (line "t") the new utilization state is (G,L). While in the (G,L) state, it will remain in the (G,L) state (line "m") while the measured utilization remains below the GTL threshold until a global-to-local activation delay counter countdown expires. If the global-to-local activation delay counter countdown expires, the global-ingress control is deactivated (line "p") and a new ingress control state (L,H) is set when the next measured utilization is greater than the LTG threshold. While in the (G,L) state if the next measured utilization falls below the LTG threshold but is greater than the idle threshold (line "q") then the new ingress control state is (L,L), otherwise if the next measured utilization falls below the idle threshold (line "r") then the new ingress control state is (L,I).

This state diagram is for illustrative purposes only and is not intended to limit in any way the number of states or transitions therebetween. Thus, different utilization thresholds (LTG and GTL) and activation delay counters may be employed to overcome the deleterious effects caused by transient utilization fluctuations and improve fairness among ABR VCs.

In another embodiment, control means may be provided for overriding activation of local-ingress and/or global-ingress control regardless of the finite state machine. Thus, local-ingress and/or global-ingress control may be turned on/off via a microprocessor as desired.

Figure 4A:
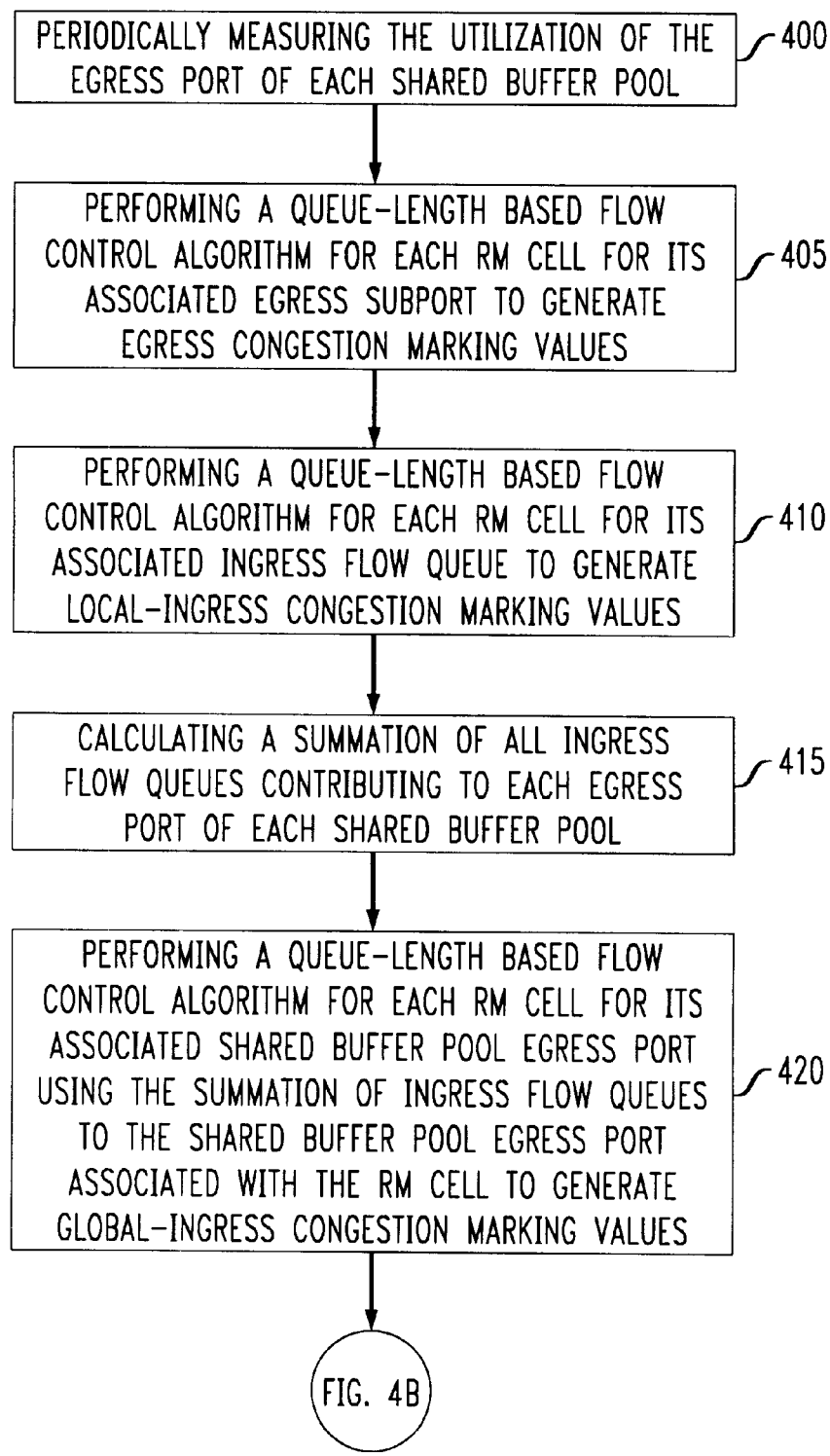

FIGS. 4a and 4b show a flow chart of the inventive dual ABR flow control method. Initially in step 400, the utilization of the egress port of the shared buffer-pool is periodically measured, for example, every 1000 cell time slots. In step 405 a first queue-length based flow control method such as DMRCA is applied to each RM cell for its associated egress subport to generate egress congestion marking values $(ER_e, CJ_e, NI_e)$ for the RM cell. Likewise, in step 410 a second queue-length based flow control method such as DMRCA is applied to the RM cell for its associated ingress flow queue to generate local-ingress congestion marking values $(ER_i, CI_i, NI_i)$ for the RM cell. In step 415 the summation of all ingress flow queues contributing to each egress port of each shared buffer-pool are calculated. In step 420 a third queue-length based flow control algorithm is then applied to the RM cell for its associated shared buffer-pool egress port using the summation of ingress flow queues contributing to the shared buffer-pool egress port associated with the RM cell to produce global-ingress congestion marking values $(ER_e, CI_e, NI_e)$ for the RM cell. In step 425 a determination is made whether congestion of the shared buffer-pool egress port associated with the RM cell is "global" based on the measured utilization of the shared buffer-pool egress port and the current state of the global-ingress control. If the congestion is not "global" then in step 430 the local-ingress, egress and original RM cell marking values $(ER_i, CI_i, NI_i)$, $(ER_g, CI_g, NI_g)$ and $(ER_{orig}, CI_{orig}, NI_{orig})$, respectively, are merged and the merged marking values are used to mark the RM cell before the RM cell departs the switch. For example, given k groups of congestion marking values $(ER_i, CI_i, NI_i)$, $(ER_2, CI_2, NI_2)$, . . . $(ER_k, CI_k, NI_k)$ the resultant merged marking values $(ER_m, CI_m, NI_m)$ are computed as follows:

$ER_m = MIN(ER_p)$, for all $ER_p$ from p=1 to k that are assigned a "set" value;

="not set", if all $ER_p$ from p=1 to k are assigned a "not set" value;

$CI_m = OR(CI_1, CI_2, \ldots . CI_k)$ $NI_m = OR(NI_1, NI_2, \ldots NI_k)$ where MIN( ) is the minimum operation and OR( ) is the binary OR operation.

If the congestion is "global" then in step 435 the local-ingress, global-ingress, egress and original RM cell marking values $(ER_i, CI_i, NI_i)$, $(ER_g, CI_g, NI_g)$, $(ER_e, CI_e, NI_e)$ and $(ER_{orig}, CI_{orig}, NI_{orig})$, respectively, are merged and the merged marking values are used to mark the RM cell before it departs the switch.

By way of example, the dual ABR flow control method is described and shown in FIGS. 4a and 4b as always performing egress, local-ingress and global-ingress congestion control. It should be noted, however, that it is contemplated that egress congestion will not develop during certain situations. Thus, in these cases egress congestion processing in step 405 may be deactivated whereby the merging and adjusting functions in steps 430 and 435 will include only local-ingress and/or global-ingress congestion marking values computation and their use for marking RM cells.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those method steps which perform substantially the same function in substantially the same way to achieve the same results are within the scope of the invention. Substitutions of steps from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto. The patents, articles and publications referred to are herein incorporated by reference.

What is claimed is:

1. A dual flow control method for available bit rate service in a distributed ingress queueing switch architecture using resource management cells carrying original congestion marking values, said switch including a plurality of egress buffer-pools each having at least one egress subport, at least one shared buffer-pool feeding into said egress buffer-pools, and a plurality of ingress buffer-pools feeding into said shared buffer-pool, wherein each ingress buffer-pool has a flow queue corresponding to each egress buffer-pool and each shared buffer-pool has at least one egress port, said method comprising the steps of:

(a) periodically measuring utilization of the egress port of each shared buffer-pool;

(b) performing a first queue-length based flow control algorithm for each resource management cell for its associated ingress flow queue to generate local-ingress congestion marking values for the resource management cell;

(c) calculating a summation of all ingress flow queues contributing to each egress port of each shared buffer-pool;

(d) performing a second queue-length based flow control algorithm for the resource management cell using the summation of all ingress flow queues contributing to the shared buffer-pool egress port associated with the resource management cell to generate global-ingress congestion marking values for the resource management cell;

(e) determining whether congestion of the shared buffer-pool egress port associated with the resource management cell is global based on the measured utilization of the shared buffer-pool egress port and a current state of global-ingress control, wherein if the congestion is not global, merging the local-ingress congestion marking values and original congestion marking values carried by the resource management cell, marking the resource management cell based on the merged congestion marking values, and repeating the process beginning at step (a); and (f) merging the local-ingress congestion marking values, the global-ingress congestion marking values and the original congestion marking values carried by the resource management cell, marking the resource management cell based on the merged marking values, and repeating the process beginning at step (a).

2. The method in accordance with claim 1, wherein step (e) further comprises the steps of toggling global-ingress control based on a plurality of utilization thresholds and a plurality of activation delay counters.

3. The method in accordance with claim 2, wherein the plural utilization thresholds include a local-to-global utilization threshold and a global-to-local utilization threshold.

4. The method in accordance with claim 2, wherein the plural activation delay counters include a local-to-global activation delay counter and a global-to-local activation delay counter.

5. The method in accordance with claim 1, wherein the first and second queue-length based flow control algorithms are the same.

6. The method in accordance with claim 1, wherein at least one of the first and second queue-length based flow control algorithms is a dynamic max rate flow control algorithm.

7. A dual flow control method for available bit rate service in a distributed ingress queueing switch architecture using resource management cells carrying original congestion marking values, said switch including a plurality of egress buffer-pools each having at least one egress subport, at least one shared buffer-pool feeding into said egress buffer-pools, and a plurality of ingress buffer-pools feeding into said shared buffer-pool, wherein each shared buffer-pool has at least one egress port, and wherein each ingress buffer-pool has a plurality of flow queues corresponding to each egress port of the shared buffer-pool, said method comprising the steps of:

(a) periodically measuring utilization of the egress port of each shared buffer-pool;

(b) performing a first queue-length based flow control algorithm for each resource management cell for its associated egress subport queue to generate egress congestion marking values for the resource management cell;

(c) performing a second queue-length based flow control algorithm for the resource management cell for its associated ingress flow queue to generate local-ingress congestion marking values for the resource management cell;

(d) calculating a summation of all ingress flow queues contributing to each egress port of each shared buffer-pool;

(e) performing a third queue-length based flow control algorithm for the resource management cell using the summation of all ingress flow queues contributing to the shared buffer-pool egress port associated with the resource management cell to generate global-ingress congestion marking values for the resource management cell;

(f) determining whether congestion of the shared buffer-pool egress port associated with the resource management cell is global based on the measured utilization of the shared buffer-pool egress port and a current state of global-ingress control, wherein if the congestion is not global, merging the egress congestion marking values, the local-ingress congestion marking values, and the original congestion marking values carried by the resource management cell, marking the resource management cell based on the merged congestion marking values, and repeating the process beginning at step (a); and (g) merging the egress congestion marking values, the local-ingress congestion marking values, the global-ingress congestion marking values, and the original congestion marking values carried by the resource management cell, marking the resource management cell based on the merged congestion marking values, and repeating the process beginning at step (a).

8. The method in accordance with claim 7, wherein step (f) further comprises the steps of toggling global-ingress control based on a plurality of utilization thresholds and a plurality of activation delay counters.

9. The method in accordance with claim 8, wherein the plural utilization thresholds include a local-to-global utilization threshold and a global-to-local utilization threshold.

10. The method in accordance with claim 8, wherein the plural activation delay counters include a local-to-global activation delay counter and a global-to-local activation delay counter.

11. The method in accordance with claim 7, wherein the first, second and third queue-length based flow control algorithms are the same.

12. The method in accordance with claim 7, wherein at least one of the first, second and third queue-length based flow control algorithms is a dynamic max rate flow control algorithm.

* * * * *